United States Patent [19]

Bogosoff

[11] Patent Number: 4,509,789
[45] Date of Patent: Apr. 9, 1985

[54] STORAGE RETAINER FOR WHEEL COVER WRENCH

[75] Inventor: John P. Bogosoff, Battle Creek, Mich.

[73] Assignee: General Motors Corporation, Detroit, Mich.

[21] Appl. No.: 541,421

[22] Filed: Oct. 13, 1983

[51] Int. Cl.³ .............................................. B62D 43/00
[52] U.S. Cl. ................................ 296/37.2; 248/205.1; 224/42.12
[58] Field of Search .................... 296/37.2; 248/205.1, 248/309.1; 224/42.12, 42.2, 42.25, 42.26

[56] References Cited

U.S. PATENT DOCUMENTS

| 2,321,239 | 6/1943 | Pond | 296/37.2 |
| 2,839,232 | 6/1958 | Homeier | 224/42.12 |
| 2,970,728 | 2/1961 | Haas, Jr. | 224/42.12 |
| 4,225,066 | 9/1980 | Barr | 224/42.25 |

Primary Examiner—Robert R. Song
Attorney, Agent, or Firm—Charles E. Leahy

[57] ABSTRACT

A storage retainer for storing a wheel cover wrench in a motor vehicle storage compartment having a spare tire mounted therein by a bolt passing through a hole in the spare tire.

4 Claims, 4 Drawing Figures

U.S. Patent            Apr. 9, 1985            4,509,789
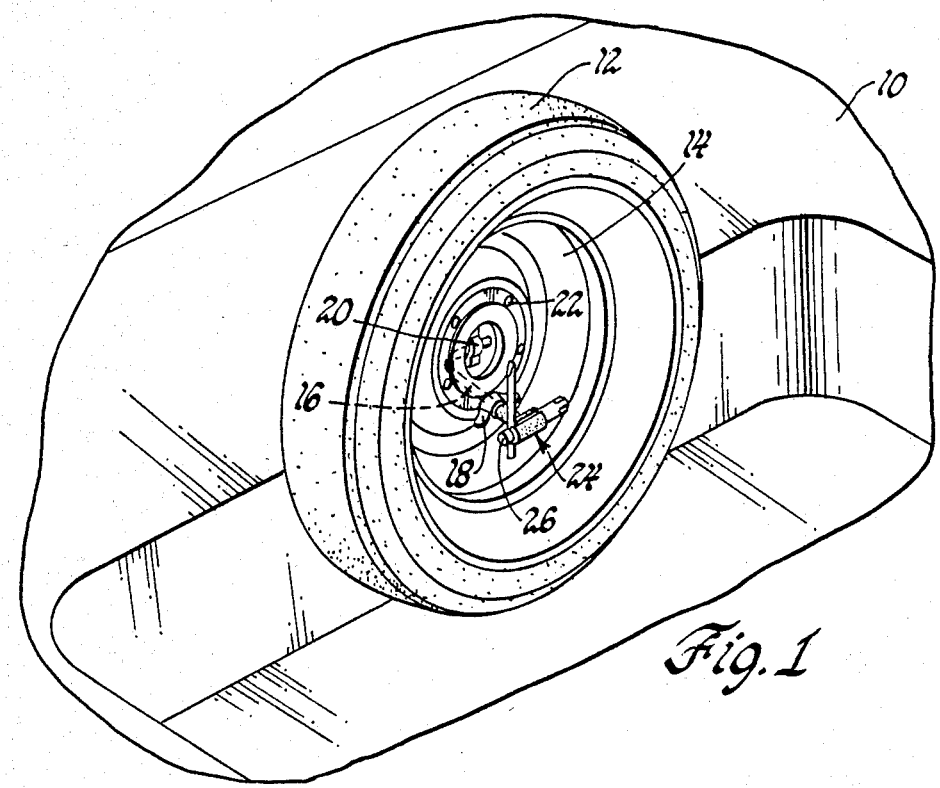
Fig. 1
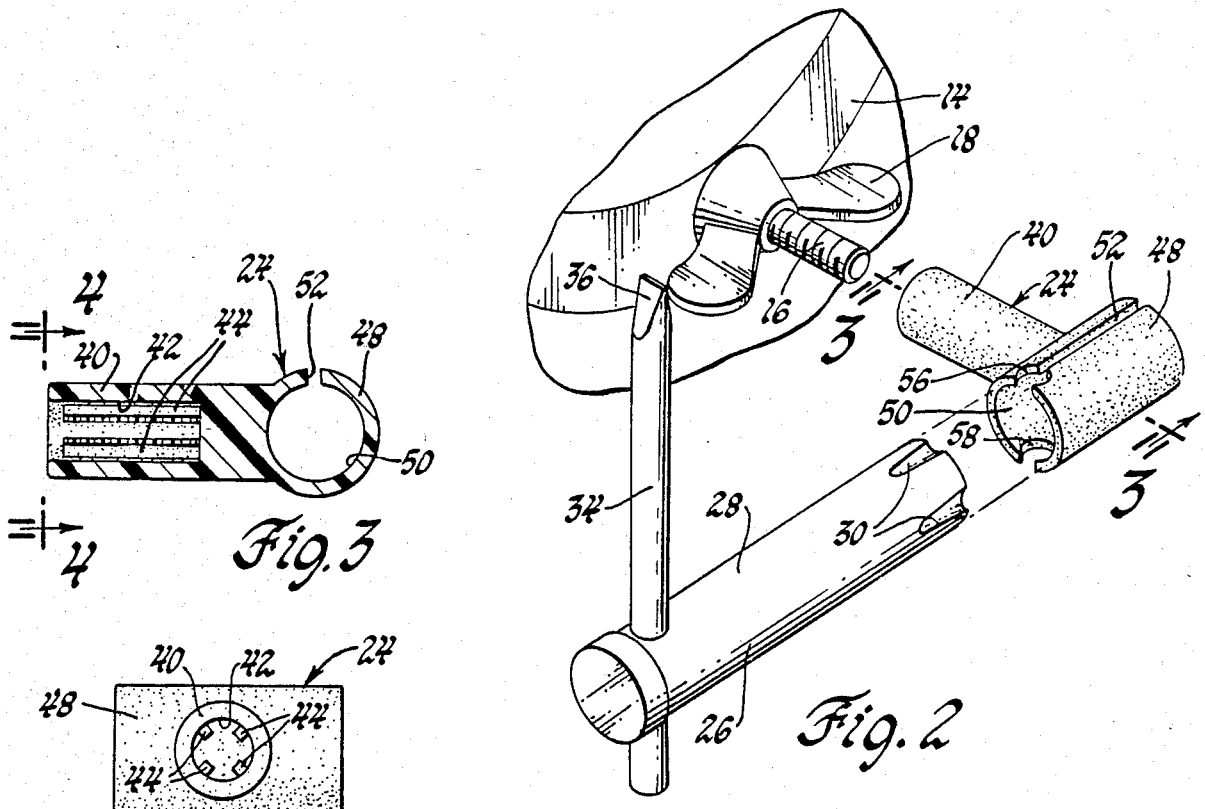
Fig. 2
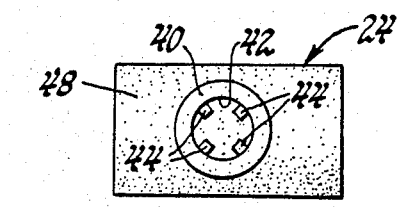
Fig. 3
Fig. 4

STORAGE RETAINER FOR WHEEL COVER WRENCH

The invention relates to a storage retainer by which a wheel cover wrench is stored upon the spare tire in the spare tire compartment.

BACKGROUND OF THE INVENTION

The automobile industry has addressed the problem of wheel cover thefts by locking the wheel covers to the vehicle wheels via nuts having unusually shaped heads to discourage removal of the nut with conveniently available tools such as wrenches, screwdrivers, etc. Accordingly, each automobile is provided with a wrench which is configured to mate with the shape of the nut to permit the vehicle ooccupant or serve attendant to remove and reinstall the wheel cover as might be necessitated in the event of a flat tire. Heretofore, the wheel cover wrench has been placed in the glove compartment. It would be desirable to store the wheel cover wrench elsewhere in the motor vehicle so that the space in the glove box compartment would be available for other use.

The present invention provides a plastic retainer by which the wheel cover wrench may be conveniently stored on the spare tire in the spare tire compartment.

SUMMARY OF THE INVENTION

A spare tire is stored in a vehicle compartment by a mounting bolt mounted in the compartment and extending through a hole in the wheel of the spare tire. A nut is screwed onto the bolt to retain the spare tire. A retainer for storing the wheel cover wrench is of molded plastic and includes an internally threaded shank adapted to screw onto the bolt and a tubular receptacle which is integral with the shank and arranged transversely with respect thereto to define a cylindrical bore which receives the tube of the wheel cover wrench. The tubular receptacle of the retainer is preferably slit along its length to enable limited outward radial flexure upon insertion of the wheel cover wrench so that the retainer will tightly grip the wrench. Furthermore, the tubular receptacle preferably has diametrically disposed semicircular openings adapted to snap receive the screwdriver handle portion of the wheel cover wrench to encourage the proper orientation of the wheel cover wrench within the storage retainer and provide additional snap retention of the wrench within the retainer. The presence of the wheel cover wrench within the storage retainer provides a convenient grip by which the storage retainer may be rotated relative to the spare tire mounting bolt to screw the retainer on and off the bolt.

Accordingly, the object, feature and advantage of the present invention resides in the provision of a plastic storage retainer by which a wheel cover wrench may be conveniently stored upon a spare tire.

A further object, feature and advantage of the invention resides in the provision of a plastic wheel cover wrench storage retainer having an internally threaded shank portion which screws onto the spare tire mounting bolt and an opening extending transversely to the shank for receiving the wheel cover wrench.

DESCRIPTION OF THE DRAWINGS

These and other features, objects and advantages of the invention will become apparent upon further consideration of the description of the preferred embodiment and the appended drawings in which:

FIG. 1 is a perspective view of a spare tire compartment showing the wheel cover wrench stored therein by the retainer of this invention;

FIG. 2 is an enlarged view similar to FIG. 1 but exploded to show the retainer and the wheel cover wrench;

FIG. 3 is a sectional view through the retainer taken in the direction of arrows 3—3 of FIG. 2; and FIG. 4 is an end view of the retainer taken in the direction of arrows 4—4 of FIG. 3.

DESCRIPTION OF THE PREFERRED EMBODIMENT

Referring to FIG. 1, there is shown a motor vehicle storage compartment 10 in which a spare tire 12 is stored. The spare tire 12 is retained in the storage compartment by a mounting bolt 16 and a wing nut 18. The bolt 16 is attached to the vehicle body by a bracket 20. The bolt 16 extends through one of the lug bolt holes 22 of wheel 14 and the wing nut 18 is threaded thereon to mount the spare tire 12 at its stored position in the vehicle compartment 10. A storage retainer 24 is provided for storing a wheel cover wrench 26.

As best seen in FIG. 2, wheel cover wrench 26 includes a tube 28 with a series of indentations 30 at the end thereof which configure the tube 28 to define a wrench for mating with a nut which locks the wheel covers in place on the vehicle wheels. Wrench 26 includes a handle 34 which extends transversely of the tube 28 and has its end chamfered to provide a screwdriver 36 which is conveniently used to pry the wheel cover off the wheel.

The storage retainer 24 is a molded plastic device which screws onto the spare tire mounting bolt 16 and receives the tube 28 of the wheel cover wrench 26. As best seen in FIGS. 2, 3 and 4, the storage retainer 24 includes a shank 40 having a bore 42 in which a plurality of toothed ribs 44 are circumferentially spaced to define threads which threadedly progress along the bolt 16 upon rotation of the storage retainer 24.

The storage retainer also includes a tubular receptacle 48 which is molded integral with the shank 40 and defines a circular bore 50 providing an opening adapted to receive the tube 28 of the wheel cover wrench 26. The tubular receptacle 48 preferably has a slot 52 along the length of the wall thereof to permit a limited outward radial flexure of the tubular receptacle 48 when the tube 28 of the wheel cover wrench 26 is force fit therein. Accordingly, an interference fit exists between the wheel cover wrench 26 and the storage retainer 24 to retain the wrench 26 at its stored position.

Furthermore, as best seen in FIG. 2, the tubular receptacle 48 preferably has a pair of diametrically opposed circular openings 56 and 58 which open onto the end of the tubular receptacle 48 and are adapted to snap receive the handle 34 to provide an additional snap retention of the wheel cover wrench 26 within the storage retainer 24.

As best seen in FIG. 1, it will be appreciated that the presence of the wheel cover wrench 26 within the storage retainer 24 provides a convenient handle which may be gripped to rotate the storage retainer 24 to install the storage retainer and remove the storage retainer from the spare tire mounting bolt 16. In fact, the wheel cover wrench 26 and the storage retainer 24 may remain together during use of the wheel cover tool to remove or reinstall the wheel covers on the vehicle. This may be particularly convenient in those instances where the storage retainer 24 must be removed from the mounting bolt 16 in order to remove the spare tire from the storage compartment 10. In other instances, where the spare tire need not be removed, it may be more convenient to simply withdraw the wheel cover wrench 26 from the storage retainer 24 and leave the storage retainer 24 screwed onto the mounting bolt 16.

The invention has been described herein in terms of the particular preferred embodiment shown in the drawings. However, it will be understood that the storage retainer of this invention may have alternate features of construction within the scope of the appended claims.

The embodiments of the invention in which an exclusive property or privilege is claimed are defined as follows:

1. A storage retainer for storing a wheel cover wrench in a motor vehicle storage compartment having a spare tire mounted therein by a bolt passing through a hole in the spare tire, comprising:
   a molded plastic body having an internally threaded bore adapted to screw onto the bolt mounting the spare tire and said molded plastic body having an opening therein adapted to receive the wheel cover wrench whereby the wheel cover wrench is effectively stored upon the spare tire mounting bolt.

2. A storage retainer for storing a wheel cover wrench in a motor vehicle storage compartment having a spare tire mounted therein by a bolt passing through a hole in the spare tire, comprising:
   a molded plastic body having an internally threaded shank adapted to screw onto the bolt mounting the spare tire and a tubular receptacle extending generally transversely of the shank and defining an opening adapted to receive the wheel cover wrench so that the wheel cover wrench is effectively stored upon the spare tire mounting bolt, and said tubular receptacle having a slot to permit limited radial flexure of the tubular receptacle to assure that the wheel cover wrench is tightly gripped.

3. In combination with a motor vehicle having a spare tire mounted in a vehicle compartment by a bolt passing through a hole in the spare tire and a wheel cover wrench having a tube indented to mate with a wheel cover lock and a handle defined by a shaft extending transversely of the tube, a storage retainer for storing the wheel cover wrench comprising:
   a molded plastic body having an internally threaded shank adapted to screw onto the bolt mounting the spare tire, a tubular receptacle integral with the shank and extending generally transversely thereof and having a bore defining an opening adapted to receive the tube of the wheel cover wrench, and snap retention means on the tubular receptacle adapted to snap engage with the handle of the wheel cover wrench to orient and retain the wheel cover wrench within the storage tubular receptacle.

4. In combination with a motor vehicle having a spare tire mounted in a vehicle compartment by a bolt passing through a hole in the spare tire and a wheel cover wrench having a tube indented to mate with a wheel cover lock and a handle defined by a shaft extending transversely of the tube, a storage retainer for storing the wheel cover wrench comprising:
   a molded plastic body having an internally threaded shank adapted to screw onto the bolt mounting the spare tire, a tubular receptacle integral with the shank and extending generally transversely thereof and having a bore defining an opening adapted to receive the tube of the wheel cover wrench, said tubular receptacle having a slot along the wall thereof to permit limited radial expansion of the tubular receptacle to provide a forced interference fit between the tubular receptacle and the tube of the wheel cover wrench, and snap retention means on the tubular receptacle adapted to snap engage with the handle of the wheel cover wrench to orient the wheel cover wrench within the storage retainer and provide additional retention.

* * * * *